June 10, 1930.　　　C. L. DAVIS　　　1,763,225
INDICATOR SYSTEM
Filed Feb. 12, 1930
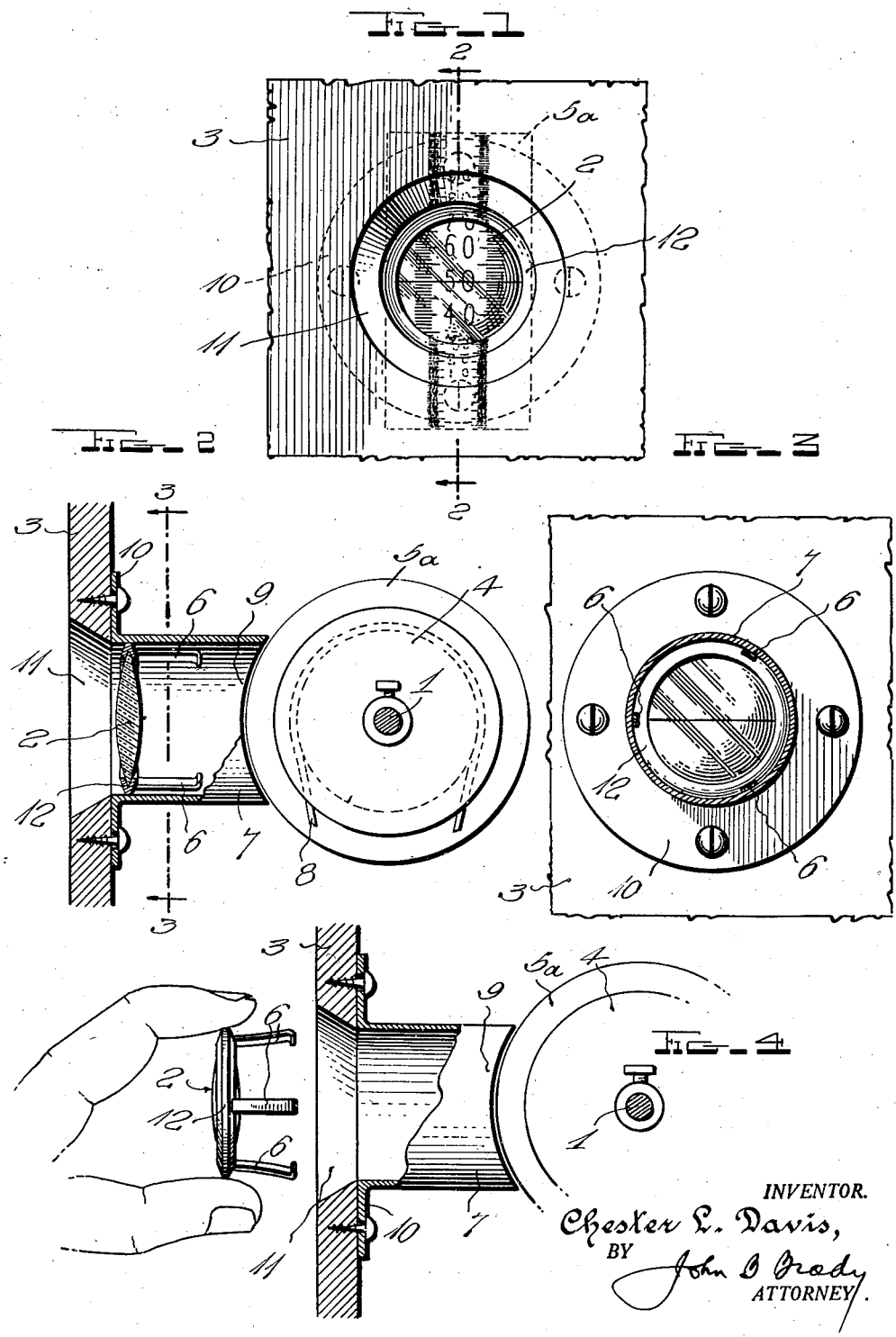
INVENTOR.
Chester L. Davis,
BY
John B Grady
ATTORNEY.

Patented June 10, 1930

1,763,225

UNITED STATES PATENT OFFICE

CHESTER L. DAVIS, OF KEOKUK, IOWA, ASSIGNOR TO WIRED RADIO, INC., OF NEW YORK, N. Y., A CORPORATION OF DELAWARE

INDICATOR SYSTEM

Original application filed March 7, 1929, Serial No. 345,167. Divided and this application filed February 12, 1930. Serial No. 427,836.

My invention relates broadly to high frequency signaling systems and more particularly to a frequency adjusting apparatus employed in signaling transmitters and receivers.

This application is a division of my application Serial No. 345,167 for "Frequency adjusting means for high frequency signaling system," filed March 7, 1929.

One of the objects of my invention is to provide means for accurately and selectively adjusting high frequency apparatus to a predetermined position for precision operation.

Another object of my invention is to provide a form of mounting for a magnifying system for observing the calibrations on an indicating drum or dial in high frequency signal transmission and receiving apparatus.

A still further object of my invention is to provide a construction of lens carrier for facilitating the focus and removal of a magnifying lens in a high frequency adjusting apparatus.

Other and further objects of my invention reside in the method of mounting an enlarged lens with respect to a frequency adjusting mechanism as set forth more fully in the specifications hereinafter following by reference to the accompany drawings, in which:

Figure 1 is a front elevation showing the observation device of my invention in position with respect to a calibrated drum in a frequency control apparatus; Fig. 2 is a cross-sectional view taken through the lens carrier and mounting therefor on line 2—2 of Fig. 1; Fig. 3 is a lateral cross-sectional view through the lens carrier and mounting on line 3—3 of Fig. 2; and Fig. 4 is a cross-sectional view through the lens housing and side elevational view of the lens carrier about to be positioned within the lens mounting adjacent the frequency control apparatus.

In high frequency signaling systems including both transmitters and receivers, some form of frequency adjusting means is employed. Associated with such means is provided a dial which is calibrated in frequency or merely in arbitrary numbers from which the frequency may be determined. It is difficult to provide an accurately calibrated disk or dial from which the frequency may be ascertained without designing a dial of large size. This dial then is subject to inaccuracies caused by temperature changes, mechanical imperfections, and inability of the operator to properly and accurately determine the calibration indicated at a particular adjustment. In my improvements in high frequency signaling systems, I provide certain features whereby the frequency adjustment of the high frequency apparatus may be accurately and readily determined and whereby the frequency is accurately and readily determined from the calibration without needless interpolation.

Referring to the drawings in detail, reference character 1 designates a rotatable shaft of a frequency control apparatus which extends substantially parallel with the rear of the instrument panel 3. A drum $5^a$ is carried by shaft 1 and is rotatably driven by suitable pulley 4 and belt 8. The drum $5^a$ carries laterally extending calibrations thereon which are extremely close together, enabling the shaft 1 to be adjusted through small angular distances represented by a multiplicity of calibrations. A hood 7 is secured to the rear of the instrument panel 3 and extends over the periphery of the calibrated drum $5^a$ through a relatively large arc. The end of the hood 7 is suitably shaped as represented at 9 to conform with the periphery of the drum $5^a$. The flange 10 on the hood 7 is secured to the end of the instrument panel 3 by suitable screws or other fastening means in such manner that the internal bore of the hood 7 registers with the aperture 11 in the instrument panel 3. An enlarging lens 2 is mounted in an annular frame 12 having a plurality of spring fingers 6 extending therefrom and frictionally engaging the interior walls of the hood 7. The enlarging lens 2 is so mounted in the carrier 12 that it is aligned with the calibrations on the drum $5^a$ and serves to enlarge the divisions on the calibrated surface of the drum $5^a$ from the condition illustrated in Figure 1 on either side of the sight aperture 11 to the enlarged condition observable through the sight aperture. The lens 2 may be moved to a selected position for focusing the calibrations on the drum to enable accurate observations to be made of the movement of the drum and thereby permitting more accurate settings of the drum for a particular frequency position than has heretofore been possible.

The advantages of the improvements in high frequency signaling systems of my invention are numerous. In the employment of extremely high frequency electrical energy, it is essential that the frequency adjusting means be accurately calibrated. The interpolation between two numbers or degrees of the calibration is difficult and accurate determination of the frequency adjustment from the calibrated indicating means is nearly impossible. This is due to the inaccuracy of calibration, mechanical features of construction or minuteness of the calibrated portion. Enlarging the calibrated drum or dial by enlarging its physical dimensions has previously been referred to and obviously is not a desirable feature. By employing an enlarging lens in the manner described, the actual physical enlargement of the calibrated portion with its accompanying disadvantages is avoided, while the dial or drum is optically enlarged to the observer. The calibration may be so small as not to be visible with the eye alone. The features of micro-mechanical adjusting means whereby effort is made to secure approximate indication is far inferior to the foregoing improvements of my invention. Physical expansion of the dial or drum due to an increase in temperature is greatly reduced by employing a small and accurately calibrated dial or drum.

While I have described my invention in a preferred embodiment, I desire that it be understood that modifications may be made and that no limitations upon my invention are intended other than are imposed by the scope of the appended claims.

What I claim as new and desire to secure by Letters Patent of the United States is as follows:

1. An indicator apparatus for frequency control systems comprising in combination with a calibrated drum, an instrument panel, a hood extending from the rear of said instrument panel and enveloping a portion of the peripheral surface of said calibrated drum, and a lens insertable through the instrument panel to a position within said hood for magnifying the calibrations on said calibrated drum.

2. An indicator apparatus comprising a rotary member having calibrations thereon, said rotary member being disposed behind an instrument panel, a hood extending between said rotary member and said instrument panel, and an enlarging lens insertable through said instrument panel to a position within said hood for viewing calibrations on said rotary member.

3. In an indicator apparatus, a rotary member having calibrations thereon, said rotary member being mounted adjacent an instrument panel, a hood extending between said instrument panel and enveloping a portion of said rotary indicator, a lens carrier insertable through said instrument panel and slidable to selected positions along said hood toward or away from said rotary member, and an enlarging lens mounted in said lens carrier for enabling the calibrations on said rotary indicator to be observed in magnified proportions through said instrument panel.

4. In an indicator apparatus, a rotatable member positioned behind an instrument panel and having calibrations thereon indicating angular movements thereof, a hood extending between the instrument panel and said rotatable member and embracing a calibrated portion of said rotatable member, a lens carrier insertable through the instrument panel and adjustable to selected positions within said hood, and an enlarging lens mounted in said lens carrier for observing the calibrations on said rotatable member in enlarged proportions.

5. In an indicator apparatus, a rotatable member having calibrations thereon, said rotatable member being movable behind an instrument panel, a hood extending between said instrument panel and enveloping a calibrated portion of said rotatable member, a lens carrier insertable through the instrument panel to a position within said hood, said lens carrier having a plurality of resilient fingers extending longitudinally therefrom for frictionally gripping the interior walls of said hood, and an enlarging lens mounted in said lens carrier for enabling the calibrations on said rotatable member to be viewed in magnified proportions through the instrument panel.

In testimony whereof I affix my signature.

CHESTER L. DAVIS.